(12) United States Patent
Yasuda et al.

(10) Patent No.: US 7,477,433 B2
(45) Date of Patent: Jan. 13, 2009

(54) HOLOGRAM RECORDING METHOD, OPTICAL RECORDING MEDIUM, AND HOLOGRAM-RECORDING DEVICE

(75) Inventors: Shin Yasuda, Ashigarakami-gun (JP); Yasuhiro Ogasawara, Ashigarakami-gun (JP); Jiro Minabe, Ashigarakami-gun (JP); Katsunori Kawano, Ashigarakami-gun (JP); Kazuhiro Hayashi, Ashigarakami-gun (JP); Hisae Yoshizawa, Ashigarakami-gun (JP); Koichi Haga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 248 days.

(21) Appl. No.: 11/041,443

(22) Filed: Jan. 25, 2005

(65) Prior Publication Data
US 2006/0007513 A1    Jan. 12, 2006

(30) Foreign Application Priority Data
Jul. 9, 2004    (JP) .......................... 2004-203766

(51) Int. Cl.
*G03H 1/10* (2006.01)
(52) U.S. Cl. ............................ 359/10; 359/3; 359/28; 359/35; 359/900
(58) Field of Classification Search .................... 359/10, 359/11, 3, 28; 369/103
See application file for complete search history.

(56) References Cited

U.S. PATENT DOCUMENTS

| | | | | |
|---|---|---|---|---|
| 5,640,255 | A | * | 6/1997 | Haines ........................... 359/2 |
| 6,052,209 | A | * | 4/2000 | Nishikawa .................... 359/12 |
| 6,369,920 | B1 | * | 4/2002 | Klug ............................ 359/15 |
| 6,728,014 | B2 | * | 4/2004 | Kodama ....................... 359/12 |

FOREIGN PATENT DOCUMENTS

| | | |
|---|---|---|
| JP | A-2000-211257 | 8/2000 |
| JP | A-2000-263910 | 9/2000 |
| JP | 2003-121827 | * 4/2003 |

* cited by examiner

*Primary Examiner*—Arnel C Lavarias
(74) *Attorney, Agent, or Firm*—Oliff & Berridge, PLC

(57) ABSTRACT

A hologram-recording method including recording a reflection-type volume hologram onto an optical recording medium by irradiating the optical recording medium with a modulated beam obtained by spatially modulating a laser beam and a diffused beam obtained by diffusing the modulated beam, coaxially but from different sides of the optical recording medium, respectively. The invention provides a hologram-recording method, an optical recording medium, and a hologram-recording device that enables on-demand recording of a reflection-type volume hologram which reliably prohibits forgery or alteration with a simple device configuration.

2 Claims, 6 Drawing Sheets

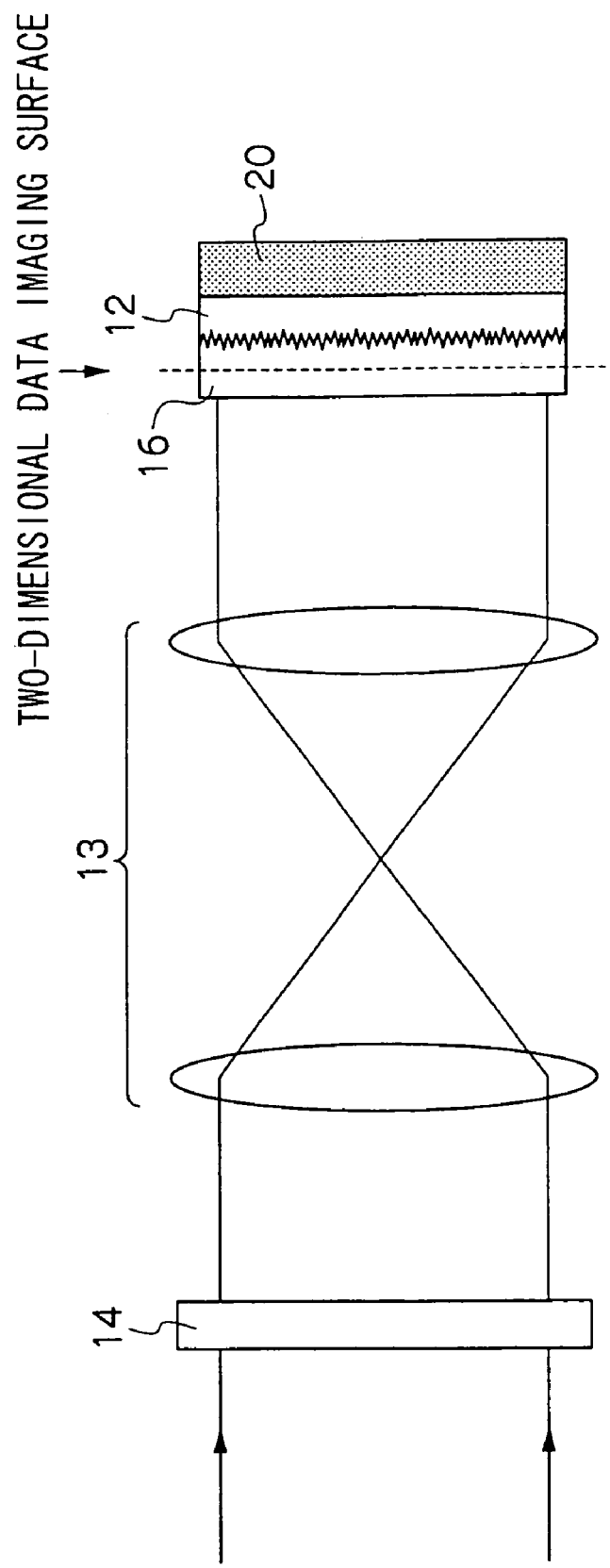

HOLOGRAM RECORDING METHOD, OPTICAL RECORDING MEDIUM, AND HOLOGRAM-RECORDING DEVICE

CROSS-REFERENCE TO RELATED APPLICATION

This application claims priority under 35 USC 119 from Japanese Patent Application No. 2004-203766, the disclosure of which is incorporated by reference herein.

BACKGROUND OF THE INVENTION

1. Field of the Invention

The present invention relates to a hologram-recording method, an optical recording medium, and a hologram-recording device, and in particular to a hologram-recording method for recording a reflection-type volume hologram on an optical recording medium, and an optical recording medium and a hologram-recording device favorably used in the recording method.

2. Description of the Related Art

Forgery and alteration of ID and credit cards and the like have been emerging as a serious social problem recently. One of the reasons for that is the progress in copying technology, which enables duplication of the hologram seals adhered for prevention of forgery.

Conventional hologram seals, which are duplicated from a master hologram, generally employ a rainbow hologram generated by surface relief pattern. For example, a press die is prepared from a master relief hologram having a surface relief pattern; a great number of hologram seals having the same pattern are produced by heat-pressing process using the die; and such hologram seals are adhered to display media such as cards.

However, duplication of the surface- relief-based pattern can be performed relatively easily by using the current copying technology. As a result, the forgery preventing effect of hologram seals is diminishing day by day.

The holograms most effective in preventing forgery and alteration are volume holograms represented by Lippmann hologram and the like. These volume holograms, which form a refractive index modulation grating in an optical material such as photopolymer instead of forming a surface relief pattern, are much more resistant to forgery.

Recently, a method of on-demand hologram printing has been proposed [Japanese Patent Application Laid-Open (JP-A) No. 2000-263910] for making the forgery more difficult. The method provides display media such as cards with, for example, a hologram adapted to individual information such as ID number, production lot, and the like, thereby making the hologram more effective for preventing alteration and thus more reliably ensuring the security of the cards. The on-demand holograms are usually printed by using a hologram transfer foil ribbon (JP-A No. 2000-211257).

However, the on-demand holograms still carry significant practical problems, for example, in that they require simultaneous irradiation of light rays reflected from an object (which will be referred to as "object light" hereinafter) and a reference beam and thus needs a large-scale device, and in that an antivibration panel is needed due to the hologram recording by interference of two optical waves.

Further, the on-demand holograms, which employ a hologram transfer foil ribbon, have the following problems: it is possible for an outsider to duplicate a similar hologram by using a hologram not printed on a display medium but remained on the transfer foil ribbon (thus it is necessary to put the transfer foil ribbon after use under strict control for prevention of forgery); and as the transfer foil ribbon is a relief hologram, it is possible to forge the hologram by examining the surface relief structure thereof.

SUMMARY OF THE INVENTION

The present invention is accomplished to solve the problems above and provides a hologram-recording method that enables, with a simple device configuration, on-demand recording of a reflection-type volume hologram which reliably prohibits forgery or alteration thereof, and an optical recording medium and a hologram-recording device for use in the method.

To achieve the purpose, the hologram-recording method according to the invention comprises recording a reflection-type volume hologram on an optical recording medium by irradiating the optical recording medium with a modulated beam obtained by spatially modulating a laser beam and a diffused beam obtained by diffusing the modulated beam, coaxially but from different sides of the optical recording medium, respectively.

For example, a modulated beam transmitted through from an optical recording medium is diffused and reflected, and the diffused beams are irradiated back onto the optical recording medium once again.

According to the present invention, an advantageous effect is obtained in that a reflection-type volume hologram higher in visibility and less vulnerable to forgery or alteration can be recorded on demand with a relatively simple device configuration.

BRIEF DESCRIPTION OF THE DRAWINGS

FIG. 8 is a schematic view illustrating a configuration wherein a spatial light modulator and an optical recording medium are not placed close to each other.

DETAILED DESCRIPTION OF THE INVENTION

Hereinafter, the present invention will be described in detail with reference to drawings.

Figure 1:
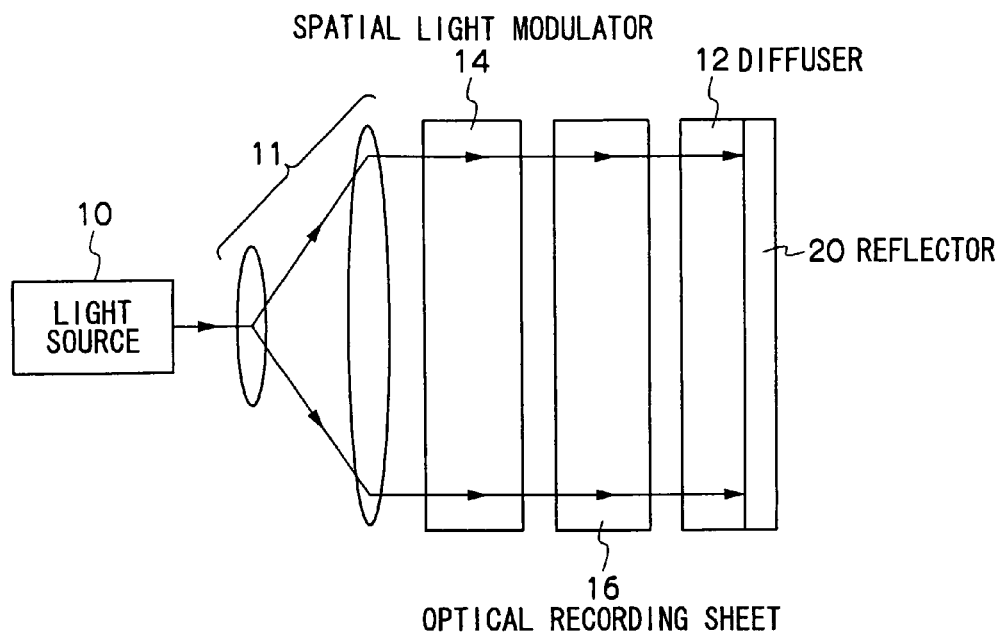
FIG. 1 is a schematic view illustrating the configuration of a hologram-recording device according to an embodiment of the present invention.

The configuration of a hologram-recording device according to the present embodiment will be first described. As shown in FIG. 1, the hologram-recording device has a laser beam source 10 that emits a laser beam as coherent light. A collimator lens (or a beam expander) 11 that collimates the emitted laser beam is located at the laser beam emitting side of the laser beam source 10. Further, a spatial light modulator 14 that modulates the laser beam incident thereon according to the recording signal and generates a modulated beam is located at the laser beam emitting side of the collimator lens 11.

When a hologram is recorded by using the hologram-recording device described above, an optical recording sheet 16 on which the hologram is to be recorded is positioned close to the spatial light modulator 14 such that a face of the optical recording sheet 16 on which recording light is incident faces the spatial light modulator 14. Alternatively, as shown in FIG. 8, a 4$f$ optical configuration 13 may be located between the spatial light modulator 14 and the optical recording sheet 16 such that the optical recording sheet 16 is placed on a plane (an imaging surface) where the real image of the two-dimensional data to be recorded is focused. The recording materials and others for use in the optical recording sheet 16 will be described below.

A plate-shaped diffuser 12 that diffuses the laser beam modulated by the spatial light modulator 14 is located at the modulated beam emitting side of the spatial light modulator 14, with the optical recording sheet 16 interposed therebetween. A reflector 20 that reflects the light diffused by the diffuser 12 (diffused beam) toward the optical recording sheet 16 is placed close to the diffuser 12 at the laser beam emitting side thereof. Further, the spatial light modulator 14 is connected to a personal computer (not shown) that drives and controls the spatial light modulator 14.

As the laser beam source 10, a laser beam source emitting a laser beam having a wavelength of 400 to 780 nm in visible region, to which laser beam the recording material is reactive, may be used. The image reproduced from a hologram normally takes on a color similar to that of the recording light. Thus, a beam having a wavelength of 580 nm or more may be used, for example, for generation of a hologram in red, and a beam having a wavelength in a range of 500 to 580 for generation of a hologram in green, and a beam having a wavelength of 500 nm or less for a hologram in blue.

A transparent-type diffuser panel of which at least one surface is roughened like ground glass may be used as the diffuser 12. An example thereof is a "frost-type diffuser panel" (#240 to #1500) manufactured by Sigma Koki Co., Ltd. The spatial light modulator 14 may be constituted of, for example, a liquid crystal display element that displays two-dimensional digital data image of the binary format generated according to recording signals. An aluminum flat mirror or the like, for example, may be used as the reflector 20.

In the hologram-recording device above, the laser beam emitted from the laser beam source 10 is modulated by the spatial light modulator 14 according to recording signals and irradiated onto the optical recording sheet 16. The laser beam may be either a plane wave, a divergent light, or a convergent light.

For example, an optical element such as a lens may be placed between the laser beam source 10 and the spatial light modulator 14, so that a plane wave emitted from the laser beam source 10 is diverged or converged and irradiated onto the spatial light modulator 14. When an image is recorded with a divergent or convergent light, only a portion of the original image is recognizable from a given observation angle. As a result, the recognizable image region varies when the image is viewed as the observation angle is changed.

Figure 3:
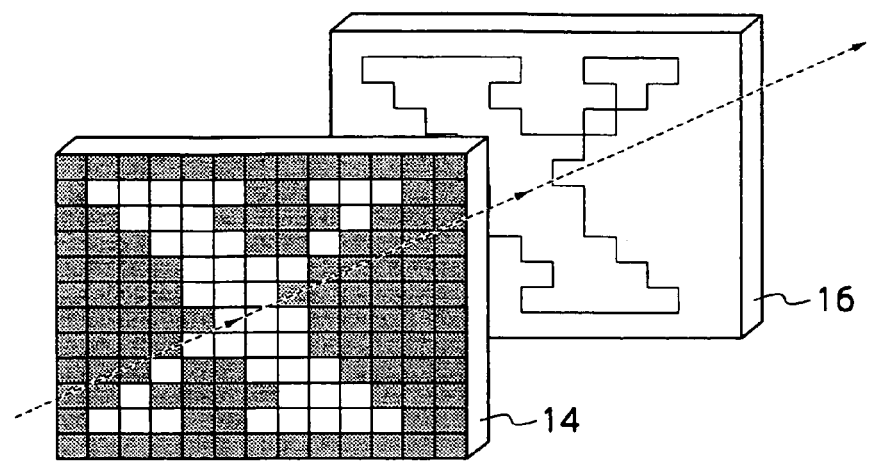
FIG. 3 is a view illustrating the intensity distribution of the light modulated by a spatial light modulator.

The spatial light modulator above 14 functions as a so-called programmable mask. Namely, as shown in FIG. 3, when a laser beam is irradiated on the spatial light modulator 14 having an image displayed thereon, the irradiated laser beam is modulated in intensity thereof in accordance with the value of each pixel of the digital data image (character "X" in FIG. 3), whereby the modulated beam is irradiated onto the optical recording sheet 16.

The modulated beam modulated by the spatial light modulator 14 is transmitted through the optical recording sheet 16 and irradiated on the diffuser 12. When the coherent light such as laser beam is transmitted through the diffuser 12, light scattered at each roughened site of the diffuser 12 (diffused beams) interferes with each other at random, whereby a spotty pattern called "speckle pattern" is generated in the diffused beams.

Figure 2:
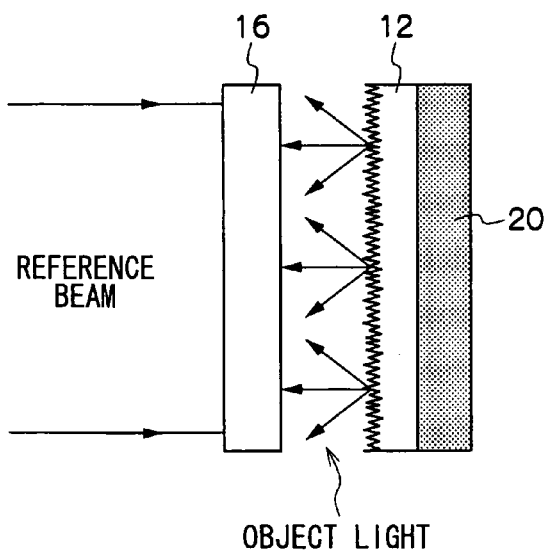
FIG. 2 is an explanatory diagram illustrating the functions of a diffuser.

As shown in FIG. 2, the diffused beams transmitted through the diffuser 12 are reflected by the reflector 20, transmitted through the diffuser 12 once again and irradiated onto the optical recording sheet 16, thereby forming the speckle pattern thereon. As described above, the modulated beam modulated by the spatial light modulator 14 is also irradiated onto the optical recording sheet 16.

A modulated beam as reference beam is irradiated on a surface of the optical recording sheet 16, while a diffused beam for forming a speckle pattern is irradiated as object light on the optical recording sheet 16 from a side different from the reference beam irradiating side, so that a refractive index modulation which corresponds to the speckle pattern is formed inside the optical recording sheet 16. In this manner, by irradiating an object light and a reference beam onto the optical recording sheet 16 from different sides, respectively, a reflection-type volume hologram is recorded at the mask-exposed area of the optical recording sheet 16.

Although an example of using a spatial light modulator controlled by computer (a programmable mask) has been described in the aforementioned hologram-recording device, it is possible to modulate the laser beam by using a mask, for example, a transparent film whereon a binary format image has been printed. Further, although the incident angle of the reference beam onto the optical recording sheet 16 surface is 0° in the example described above, the reference beam may be irradiated from a predetermined angle other than 0°.

The optical recording sheet 16 will be described next. The optical recording sheet 16 may be used in a state in which the sheet is attached to a surface of a base material. When the optical recording sheet 16 is used in a state in which the sheet is attached to a surface of a base material, the optical recording sheet and the base material altogether can be regarded as an integral member and referred to as an "optical recording medium". Examples of the base material to which the optical recording sheet 16 is attached include: a plate-shaped base material such as a plastic card; and a sheet-shaped base material such as paper, metal layer, and resin film. When an optical recording sheet 16 is made integral with a sheet-shaped base material such as paper, resin film or the like, the "optical recording medium" may further be attached to another base material such as a plastic card or the like for use.

Further, if the optical recording medium does not function to effect diffusive reflection, an optical recording sheet 16 where a hologram has already been recorded is attached to a surface of a base material. In contrast, when the optical recording medium has a function of diffusive reflection, recording can be carried out in a state in which the optical recording sheet 16 is placed on the surface of the base material. The optical recording media having a function of diffusive reflection will be described below.

Figure 4A:
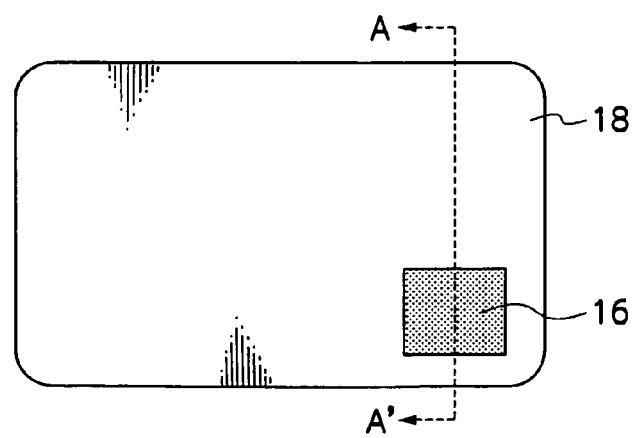
FIG. 4A is a view illustrating a hologram sheet adhered on a card.
Figure 4B:
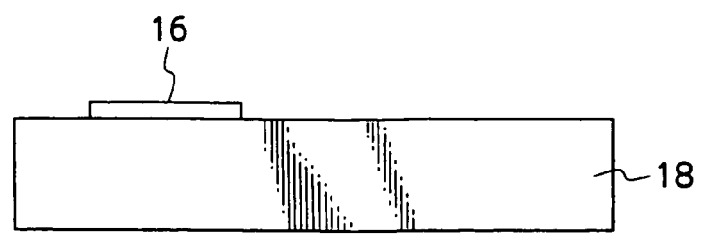
FIG. 4B is a cross-sectional view of the card shown in FIG. 4A, taken on the A-A' line.

FIGS. 4A and 4B show a small piece of an optical recording sheet 16 (a rectangle having a few mm side length) adhered onto a surface of a support 18 as a plastic card of credit card size. In this example, the optical recording sheet 16 is attached to the right bottom side of the support 18.

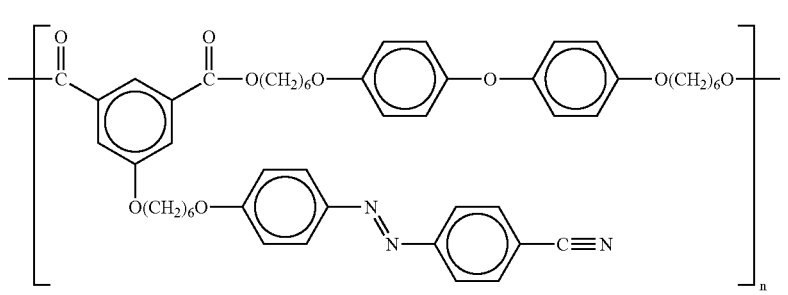

[Formula 1]

The optical recording sheet 16 is made of a recording material that allows writing of a volume hologram on the basis of a change in refractive index. Examples of the recording materials include photopolymers and the like. As the photopolymers, for example, the photopolymers disclosed in Japanese Patent No. 2849021 can be used.

As the recording material, also usable are photorefractive materials, photochromic materials, and polarized light-sensitive materials that exhibit a photo-induced change in refractive index or a photoinduced dichroism and retain these properties at the room temperature. These photorefractive materials, photochromic materials, and polarized light-sensitive materials allow removal of a prerecorded hologram and recording of a new hologram, i.e., rewriting of a hologram by photoirradiation.

Among them, preferable are polymers having a photoisomerizable group on a side chain thereof, for example, at least one type of polymer selected from polyesters having, on a side chain thereof, a photoisomerizable group such as an azobenzene skeleton.

Azobenzene repeats trans-cis-trans isomerization cycles by photoirradiation. Before photoirradiation, there exist many azobenzene molecules in the trans form in the optical recording layer. These molecules are randomly oriented and thus macroscopically isotropic. When irradiated with a linearly polarized light, azobenzene molecules having an absorption axis parallel to the polarization direction of the light are selectively excited and subjected to trans-cis isomerization. The azobenzene molecules in a relaxed state in which the molecules in the trans form each have an absorption axis orthogonal to the polarization direction of the light do not absorb the light any more and remain in the state. As a result, anisotropies in absorption coefficient and refractive index, i.e., dichroism and birefringence, are induced macroscopically. Such a polymer having a photoisomerizable group also experiences a change in orientation of the polymer itself, due to the photoisomerization, thereby inducing a significantly large change in birefringence of the polymer. The birefringence thus induced remains stable at a temperature no higher than the glass transition temperature of the polymer, and thus is favorable for hologram recording.

For example, the polyester having cyanoazobenzene on a side chain thereof represented by the Formula 1 below (JP-A No. 10-340479) is favorable as the material for recording a hologram by the mechanism described above. The polyester records the polarization direction of a signal light as a hologram based on the photo-induced anisotropy triggered by photoisomerization of the cyanoazobenzenes on the side chains, thus allows recording of the hologram at room temperature, and maintains the recorded hologram semipermanently unless an eraser light is irradiated thereon.

The thickness of the optical recording sheet 16 is preferably in a range of 3 to 200 μm in terms of preventing bulkiness, and more preferably in a range of 10 to 100 μm in terms of enhancing the diffraction efficiency. The optical recording sheet 16 can be produced, for example, by preparing a plate-shaped mold by injection molding and subjecting the plate-shaped mold to hot press under vacuum, with the mold being sandwiched with a pair of mold-releasing resin films. The optical recording sheet 16 is then removed from the resin films and cut into small pieces of several mm square (e.g., 8 mm square) before use. The heating temperature is preferably a temperature no lower than Tg of the recording material, and the press pressure is preferably 0.01 to 0.1 t/cm². An example of the mold-releasing resin film is a polyethylene terephthalate (PET) film having a silicone resin as the releasing agent coated on the surface thereof.

It is preferable to form a protective layer on the surface of the optical recording sheet 16. The protective layer may be made of a flexible resin material transparent to the laser beam employed for recording and reproduction. The thickness of the protective layer is preferably in a range of 1 to 200 μm in terms of preventing bulkiness, and the thinner protective layer is the more preferable, as long as the thickness thereof stays within the aforementioned range. The transmittance of the laser beam employed for recording and reproduction through the protective layer is preferably 50% or more and more preferably 80% or more, from the viewpoint of light utilization efficiency.

Figure 5A:
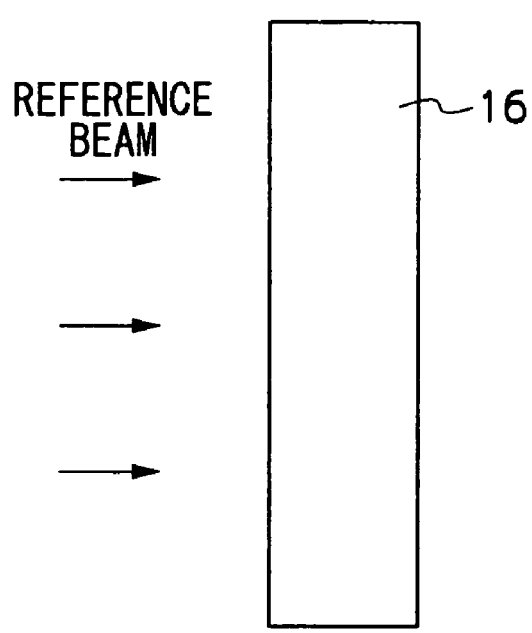
FIGS. 5A and 5B are cross-sectional views along the optical axis illustrating a state in which the diffused beams which have been reproduced are being emitted.
Figure 5B:
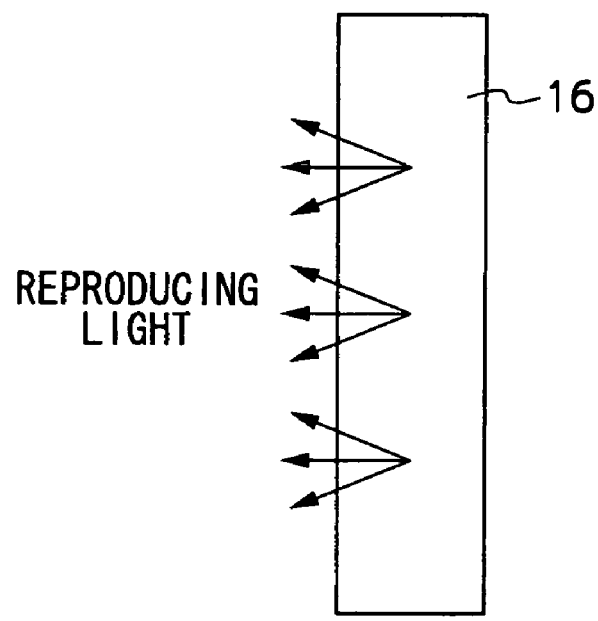

Reproduction of the hologram recorded on the optical recording sheet 16 will be described hereinafter with reference to FIGS. 5A and 5B. When a reference beam is irradiated onto an optical recording sheet 16 as shown in FIG. 5A, diffused beams are generated from the hologram of the speckle pattern recorded on the optical recording sheet 16 and emitted from the reference beam irradiation side of the optical recording sheet 16, as shown in FIG. 5B. As a result, diffused beams are observed in the area where the speckle pattern is recorded.

When a hologram is recorded by using a laser beam having a single wavelength, if white light is irradiated during the reproduction process, a reproduced image in the color corresponding to the wavelength of the recording light is visually observed. For example, when a hologram is recorded by using a laser beam having a wavelength of 532 nm, a reproduced image of green color is visually observed.

On the other hand, when a hologram is recorded by using multiple laser beams of different wavelengths that are reactive to the recording material (wavelength multiplexing method), if white light is irradiated during the reproduction process, a reproduced image of multiple colors corresponding to the wavelengths of the recording lights is visually observed. For example, when a hologram is recorded by using laser beams having wavelengths of 488 nm, 532 nm, and 633 nm, respectively, a reproduced image of blue, green, and red colors is visually observed.

The wavelength multiplexing may be carried out by either effecting simultaneous exposure by simultaneously irradiating laser beams of different wavelengths or effecting stepwise exposure by irradiating laser beams of different wavelengths stepwise in a predetermined order.

—Recording and Reproduction Experiment—

The optical recording sheet used is a photopolymer "Omni-Dex® HRF-800" (film thickness: 15 μm) manufactured by du Pont.

The optical recording sheet as described above is placed on "Frost Diffuser Panel, #600" manufactured by Sigma Koki Co., Ltd. having a reflector manufactured by Sigma Koki Co., Ltd. on the rear face thereof, with using as a mask an overhead projector (OHP) sheet where a binary format image of an outline character "X" has been printed. With the mask being laid on the optical recording sheet, the optical recording sheet is exposed, by way of the mask, to a laser beam having a wavelength of 532 nm and light intensity of 20 mJ/cm$^2$. The total exposure quantity is 1.2 J/cm$^2$. After the exposure, the optical recording sheet is heated at 100° C. for 120 minutes.

When the optical recording sheet where a hologram has been recorded is placed on a black paper and a white light is irradiated thereon, a reproduced image corresponding to the recorded hologram is obtained. It is confirmed that the original image (character "X") printed on the OHP sheet as the mask has been reproduced. The reproduced image is visually observed from a wide range of observation angle. printed on the OHP sheet as the mask has been reproduced. The reproduced image is visually observed from a wide range of observation angle.

As described above, in the present embodiment, as a refractive index modulation corresponding to a speckle pattern, i.e., a volume hologram is recorded in an optical recording sheet, forgery or alteration of the recorded hologram is reliably prevented. Further, the reproduced image obtained from the recorded hologram is visually observable from a wide range of observation angles and thus exhibits superior visibility.

Further, a volume hologram can be recorded by irradiating a reference beam and an object light in one light flux, thereby making the hologram-recording device simpler in structure. Yet further, because a hologram can be recorded by using any image-displaying mask, it is possible to record, on demand, with a relatively simple device configuration, a volume hologram which reliably prohibits forgery and alteration.

Hereinafter, modifications of the present embodiment will be described.

(1) A modified example of the present embodiment wherein the diffuser and the reflector of a hologram-recording device are integrated.

Figure 6A:
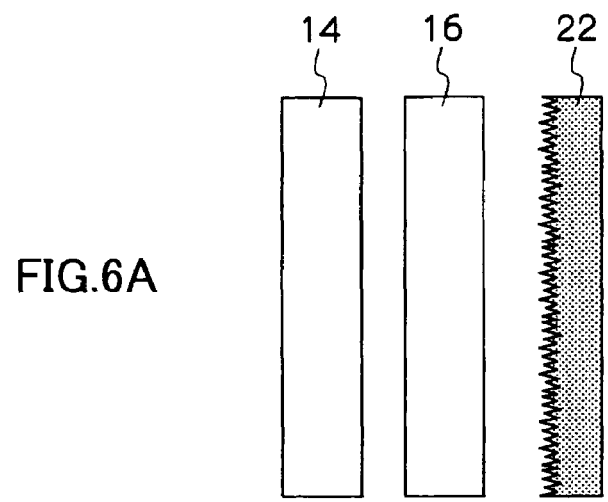
FIGS. 6A to 6C are schematic views respectively illustrating essential configurations of the modified examples of the hologram-recording device of the embodiment.

Although the hologram recording device in which the diffuser and the reflector are separately designed has been described above, it is also acceptable that, as shown in FIG. 6A, a plate-shaped reflection diffuser 22 that reflects and diffuses the laser beam modulated by the spatial light modulator 14 is placed at the modulated beam emitting side of the spatial light modulator 14 so as to interpose the optical recording sheet 16 between the spatial light modulator 14 and the plate-shaped reflection diffuser 22. The reflection diffuser 22 reflects the diffused beams toward the optical recording sheet 16. Examples of the reflection diffusers 22 include a metal plate having a roughened (reflecting) surface and the like.

(2) A modified example of using an optical recording medium having a capacity of diffusive reflection.

Figure 6B:
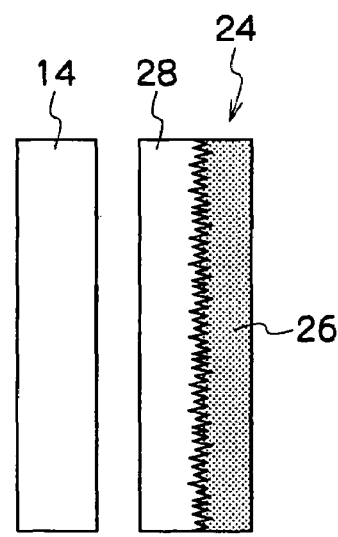

Although an example of recording a hologram on an optical recording medium not having a capacity of diffusive reflection has been described above, it is possible, as shown in FIG. 6B, to record a hologram by using an optical recording medium 24 having a capacity of diffusive reflection. The optical recording medium 24 includes a diffusive reflection base material 26 and a recording layer 28 formed thereon, on which recording layer a hologram can be recorded. In this example, a diffuser and a reflector at the side of the hologram-recording device are rendered unnecessary.

In this configuration, a modulated beam modulated by the spatial light modulator 14 is transmitted through the recording layer 28, reflected and diffused by the diffusive reflection base material (diffusive reflector) 26, so that object light in the speckle pattern is incident on the recording layer 28. Examples of the diffusive reflection base material 26 include paper, plastic card, a metal plate and the like of which surface has been made irregular.

Figure 7A:
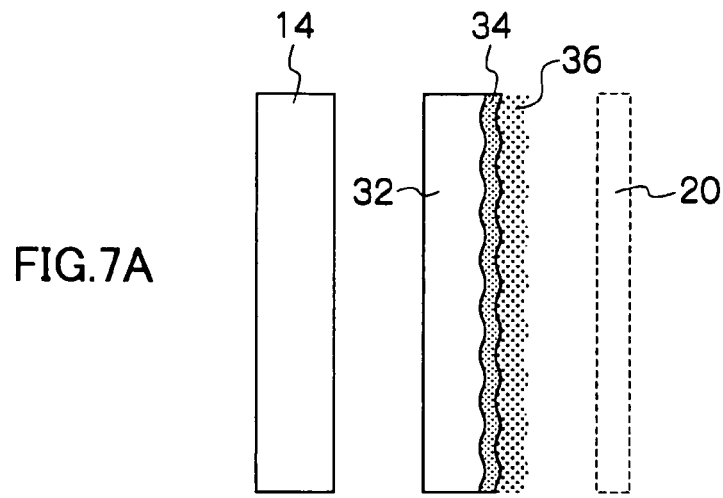
FIGS. 7A to 7C are schematic views respectively illustrating other embodiments of the optical recording media having a diffuse reflection function.

Alternatively, as shown in FIG. 7A, a recording layer 32 may be formed on a sheet of paper 36 such as plain paper via a reflection layer 34 therebetween.

Figure 7B:
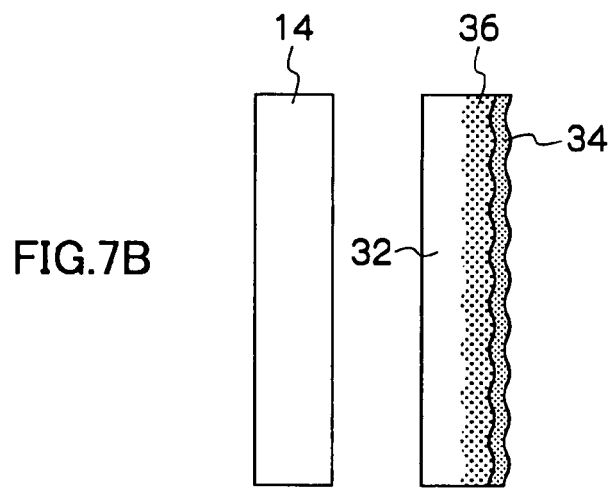

Yet alternatively, as shown in FIG. 7B, a recording layer 32 may be formed on a sheet of paper 36 such as plain paper with a reflection layer 34 formed on the rear face of the paper 36. If the reflectance of the paper 36 is significantly high, the reflection layer 34 may be omitted.

In these cases, it is preferable to provide a reflector 20 in the hologram-recording device.

Figure 7C:
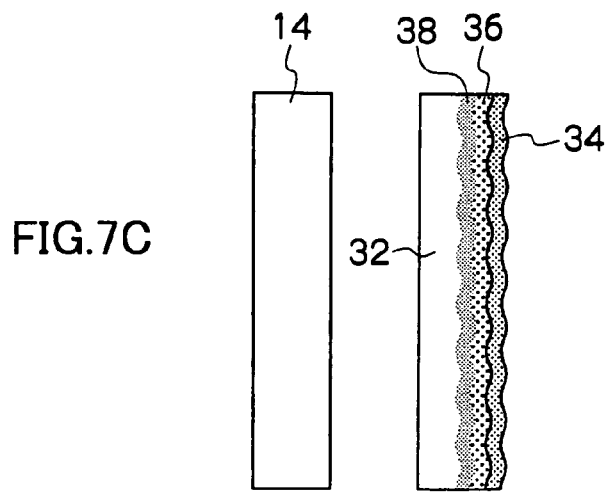

Further, as shown in FIG. 7C, a recording layer 32 may be formed on a sheet of paper 36 such as plain paper via a diffusion layer 38 therebetween, with a reflection layer 34 formed on the rear face of the paper 36.

The reflection layer 34 is made of a thin film of a lightreflecting material having a reflectance of 70% or more with respect to the laser beam used for recording and reproduction. Examples of the light-reflecting materials include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi; and stainless steels. Among them, Au, Ag, Al, and the alloys thereof are preferable, and Al (aluminum) is particularly preferable. The light-reflecting materials described above may be used alone or in combination of two or more.

The reflection layer 34 can be formed, for example, by preparing a thin film of the aforementioned light-reflecting material, such as an aluminum foil, and adhering the thin film onto the paper 36. The thickness of the reflection layer 34 is preferably in a range of 1 nm to 100 μm in terms of preventing bulkiness. The thinner the reflection layer 34 is the more preferable, as long as the thickness stays within the aforementioned range. The diffusion layer 38 may be made of the same material as that for the diffuser 12.

(3) A modified example of using an optical recording medium having a capacity of diffusive reflection.

Figure 6C:
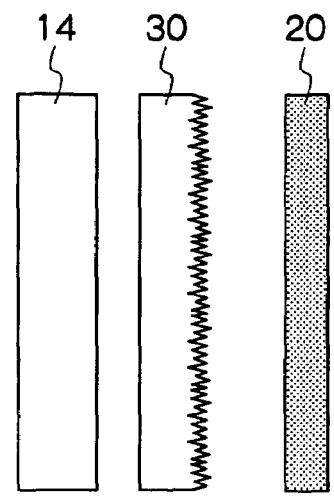

Although an example of recording a hologram on an optical recording medium not having a capacity of diffusive reflection has been described above, it is possible, as shown in FIG. 6C, to record a hologram by using an optical recording medium 30 having a capacity of diffusive reflection. A surface at the light emitting side of the optical recording medium 30 has been roughened so that the optical recording medium is capable of diffusive reflection. In this case, a diffuser at the side of the hologram-recording device is rendered unnecessary.

In this configuration, the modulated beam modulated by the spatial light modulator 14 is diffused as the beam is transmitted through the optical recording medium 30, reflected by the reflector of the hologram-recording device, and irradiated as a speckle pattern on the optical recording medium 30.

What is claimed is:

1. A hologram-recording method, comprising recording a reflection-type volume hologram in an optical recording medium by irradiating the optical recording medium with a modulated beam obtained by spatially modulating a laser beam and a diffused beam obtained by diffusing the modulated beam by a diffuser, coaxially but from different sides of the optical recording medium, respectively, and forming an image in the optical recording medium, wherein the diffuser is in direct contact with a recording layer and the optical recording medium includes the diffuser and the recording layer without any intervening layer between the diffuser and the recording layer.

2. The hologram-recording device of claim 1, wherein the laser beam spatially modulated is a plane wave.

* * * * *